(12) United States Patent
Woestmann et al.

(10) Patent No.: US 8,153,012 B2
(45) Date of Patent: Apr. 10, 2012

(54) DEVICE AND METHOD FOR FILTERING A FLUID, IN PARTICULAR FOR PLASTICS PROCESSING PLANTS

(75) Inventors: Stefan Woestmann, Sassenberg (DE); Dirk Bussmann, Muenster (DE)

(73) Assignee: Kreyenborg Verwaltungen und Beteiligungen GmbH & Co. KG, Muenster (DE)

( * ) Notice: Subject to any disclaimer, the term of this patent is extended or adjusted under 35 U.S.C. 154(b) by 1112 days.

(21) Appl. No.: 11/568,756

(22) PCT Filed: Jul. 7, 2005

(86) PCT No.: PCT/DE2005/001201
§ 371 (c)(1), (2), (4) Date: Nov. 6, 2006

(87) PCT Pub. No.: WO2006/012828
PCT Pub. Date: Feb. 9, 2006

(65) Prior Publication Data
US 2007/0209980 A1   Sep. 13, 2007

(30) Foreign Application Priority Data
Jul. 28, 2004  (DE) .................. 10 2004 036 597

(51) Int. Cl.
*B01D 29/66* (2006.01)
(52) U.S. Cl. ........ 210/741; 210/790; 210/791; 210/137; 210/333.1; 210/412
(58) Field of Classification Search ............ 264/39; 210/333.1, 411, 412, 137, 741, 790, 791
See application file for complete search history.

(56) References Cited

U.S. PATENT DOCUMENTS

| | | | |
|---|---|---|---|
| 5,090,887 A | 2/1992 | Gneuss | |
| 5,417,856 A | 5/1995 | Bacher et al. | |
| 5,453,194 A * | 9/1995 | Klein | ............ 210/411 |
| 6,783,667 B1 | 8/2004 | Van Den Goorbergh | |
| 2003/0132146 A1 | 7/2003 | Gneuss | |

FOREIGN PATENT DOCUMENTS

| | | |
|---|---|---|
| DE | 1788037 | 5/1959 |
| DE | 3527173 | 9/1986 |
| DE | 3902061 | 7/1990 |
| EP | 0554237 | 8/1993 |
| WO | 9216351 | 10/1992 |
| WO | 9847688 | 10/1998 |
| WO | 0143847 | 6/2001 |
| WO | 0154793 | 8/2001 |

OTHER PUBLICATIONS

English Translation of DE 3902061A1; Jul. 1990.*
English Translation of EP 0554237A1; Aug. 1993.*
International Search Report for PCT/DE2005/001201.

* cited by examiner

*Primary Examiner* — Terry Cecil
(74) *Attorney, Agent, or Firm* — Greenblum & Bernstein, P.L.C.

(57) ABSTRACT

The invention relates to a device for filtering a fluid, in particular a liquefied plastic, with a housing with backflush channel and screen carrier and filter element whereby, in order to accelerate and improve the backflush effect, one or more displacement cylinders are provided that guide material removed from the production at adjustable high pressure and speed to the screen to be cleaned from the clean screen side to the dirty screen side, whereby an additional pressure generator ensures constant process pressure.

25 Claims, 2 Drawing Sheets

DEVICE AND METHOD FOR FILTERING A FLUID, IN PARTICULAR FOR PLASTICS PROCESSING PLANTS

CROSS-REFERENCE TO RELATED APPLICATION

The present application is a U.S. National Stage of International Patent Application No. PCT/DE2005/001201 filed Dec. 6, 2005, and claims priority of German Patent Application No. 10 2004 036 597.0 filed Jul. 28, 2004. Moreover, the disclosure of International Patent Application No. PCT/DE2005/001201 is expressly incorporated by reference herein in its entirety.

BACKGROUND OF THE INVENTION

1. Field of the Invention

The invention relates to a device for filtering a liquefied plastic, with a housing, a supply channel, a discharge channel and backflush channels, whereby in the flow path of the plastic melt, in two screen carriers slideably supported crosswise to the flow direction, at least one filter element each is arranged in a corresponding screen chamber and can be linked to the supply channel and the disposal channel, and a displacement piston that loads the clean screen side with purified plastic melt when the screen carrier is in the backflush position.

2. Discussion of Background Information

A filtration device for contaminated fluids and method of operation is known from EP 0 554 237 A. In this known device at least one reservoir for holding a quantity of fluid required in the backflushing operation is connected to at least one discharge channel. A piston for displacing fluid out of the reservoir is guided in the reservoir, whereby during the backflushing operation this reservoir is in free flow connection for the purified fluid with the discharge side of the screen nest to be backflushed and with the discharge channel. During normal production the reservoir or storage chamber is filled with plastic material and, in the case of backflushing, is not only connected to the screen nest to be backflushed, but the displacement piston guided in the reservoir also acts on the normal production channel that leads from the screen then in operation to the equipment or tool. The problem occurs here that, with the reservoir opening into the production channel, the plastic mass to be forced out of the reservoir in part has to flow against the flow direction in the production channel in order to backflush the screen. However, part of the plastic material forced out of the reservoir also flows in the direction of the production channel, i.e., in the direction towards the tool. Problems therefore occur here that are difficult to overcome in practice.

The pressure constant mentioned in this reference cannot be achieved, since it is here a matter of communicating tubes, i.e., connected pressure chambers. Furthermore, the resistance towards the backflush opening is much lower than towards the tool, so that a substantial pressure loss must occur at the tool itself.

WO 98/47688 describes a screen unit for viscous masses, i.e., liquefied plastic, in which likewise a displacement piston forces a purified plastic mass back through the screen in order to thus carry out the backflushing operation. This arrangement has the disadvantage that valve devices have to be present that close the backflush channel during the normal mode of operation, thus during the production phase. Such valve devices are undesirable in the processing of fluid thermoplastic material, since they can lead to clogs and, naturally, in addition must be heated. A decomposition of the plastic material can also occur in this area, since the valve device can never be cleaned completely.

Furthermore this known device has the disadvantage that the entire valve device has to be removed to replace the screens, i.e., the known device is therefore embodied in a relatively complex manner.

A device is known from DE 17 88 037 U1 for separating mixtures containing liquid and solid matter, in which the liquid containing solid material is guided through a screen, whereby an accumulator piston is moved back at the same time. A discharge line is connected to the area of the accumulator piston, through which line the purified liquid is discharged. The connection between the accumulator piston and the discharge line is equipped with a check valve that opens when the accumulator piston generates a corresponding pressure in the discharge line. At the same time, the purified liquid can also be pressed through the screen again with the movement of the accumulator piston, in order to clean the screen of trapped solid particles. A device of this type cannot be used for liquefied plastic, in particular because in the discharge channel the check valve provided there would very quickly clog and become unusable. Moreover, material being retained in the area between the check valve and accumulator piston would disintegrate, i.e., dead zones are also present here which definitely must be avoided in processing liquid plastic.

SUMMARY OF THE INVENTION

The invention is directed to a device and a method for backflushing for liquefied plastic material, which, without disturbing the material flowing in the production channel, avoids a loss of mass in the main flow at the time of backflushing and ensures that no material can accumulate in the area of the displacement piston that can crack and therefore lead to disturbances during backflushing.

This is attained through the teaching of the device for filtering a fluid, in particular a liquefied plastic, with a housing with a supply channel, a discharge channel and backflush channels, whereby in the flow path of the fluid, in a screen carrier slideably supported crosswise to the flow direction, at least one filter element each is arranged in a corresponding screen chamber and can be linked to the supply channel and the discharge channel. The device includes a displacement piston can be inserted in a partial channel leading from the screen chamber to the discharge channel, which piston feeds the mass free of contaminants out of the partial channel through the filter element to the assigned backflush channel when the screen carrier is in the backflush position, at least two filter elements in corresponding screen chambers and at least two displacement pistons are provided, at least two partial channels and at least two backflush channels are provided and a pressure generator is arranged in the supply channel, which pressure generator maintains a constant process pressure at the discharge channel and the downstream equipment during the production phase. This is also attained through the teaching of a method for backflushing with a device for filtering a fluid, in particular a liquefied plastic. The method provides that in the backflush position of the screen carrier a displacement piston is plunged into a partial channel and forces the fluid out of the partial channel through the filter element in the backflush position, whereby the filter element is acted on with a pressure that is substantially higher than the operating pressure prevailing on the production side of the screen and whereby a constant melt pressure is maintained at the discharge channel via a pressure generator arranged in the supply channel.

According to this teaching the so-called displacement pistons are assigned to the partial channels leading from the screen chamber or chambers to the discharge channel. These partial channels are thus embodied straight and relatively long, and a displacement piston opens into these partial channels which, in the backflushing position, feeds the contaminant-free material located in this partial channel to the back of the filter element, namely in turn at a pressure that is much higher than the pressure that normally prevails on the clean screen side in the production position of the screen carrier. In this manner, an additional pressure generator ensures a constant process pressure in the supply channel, even when the displacement piston is drawn back.

Furthermore, the invention provides that the screen carrier can be displaced such that the filter elements can be removed from the screen chambers.

Connection plates are preferably connected to the housing accommodating the screen carrier, whereby the displacement pistons are more easily replaceable and the channels are easier to produce.

The displacement piston or pistons can be acted on hydraulically, mechanically, e.g., via toggle lever systems, toothed racks, etc.

A flow divider can be housed in the supply channel and a flow diverter can be housed in the discharge channel in order to thus create good flow conditions.

The operating pressure of the displacement piston or pistons can be preset.

Finally, in the invention a backflushing method with a device for filtering a fluid, in particular a liquefied plastic is provided. In the backflush position of the screen carrier the screen in the backflush position is acted on via displacement pistons with a pressure that acts exclusively in the direction of the backflush flow and which can be much higher than the operating pressure prevailing on the production side of the screen. Also, a constant process pressure can be maintained via a pressure generator in the supply channel.

The device according to the invention and the method according to the invention have the great advantage that the backflushing occurs immediately as soon as a corresponding demand signal occurs. Also, a constant process pressure prevails in the connected apparatus or tool.

BRIEF DESCRIPTION OF THE DRAWINGS

An exemplary embodiment of the invention is explained below on the basis of the drawings. The drawings show.

DETAILED DESCRIPTION OF THE PRESENT INVENTION

Figure 1:
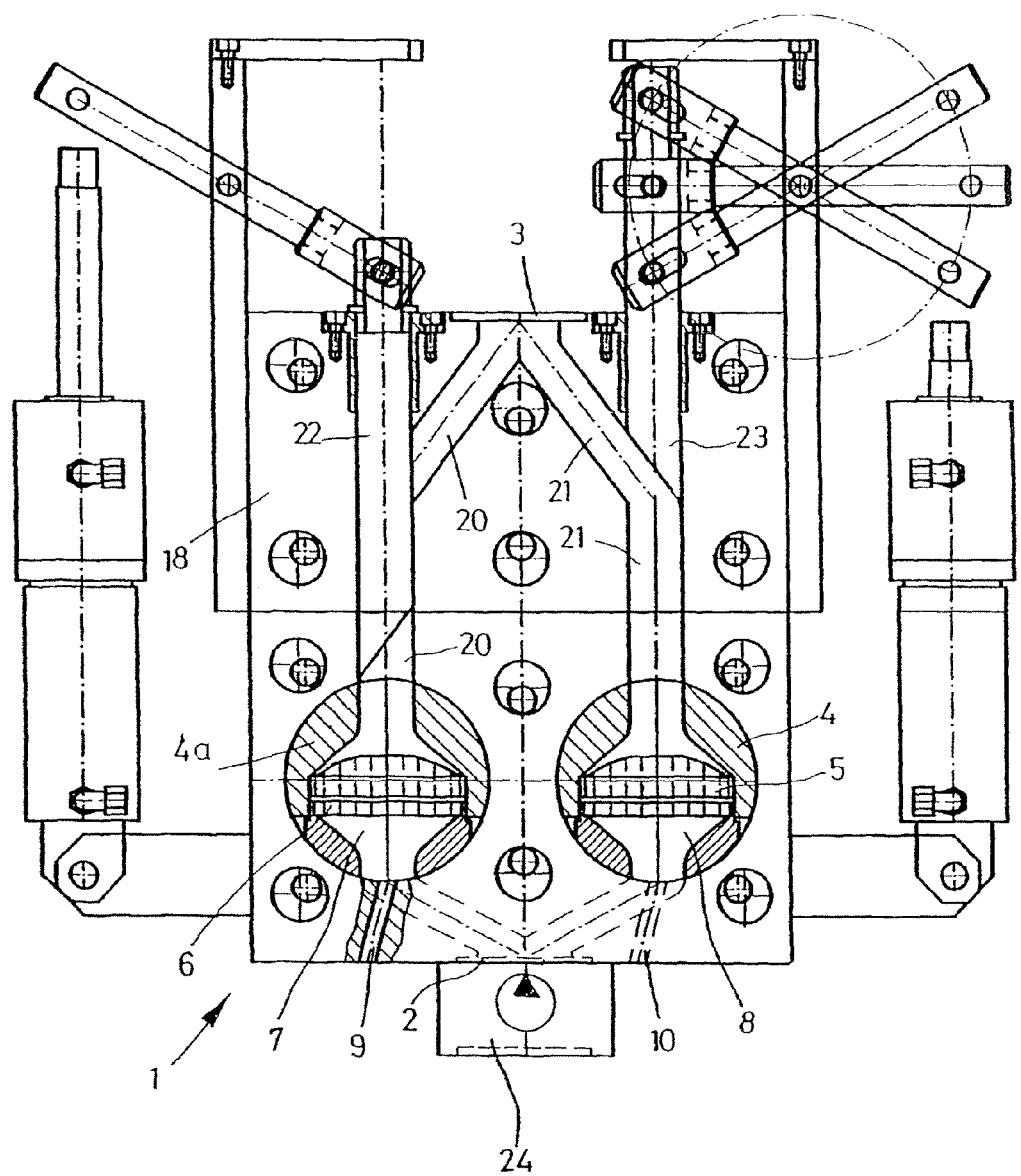
FIG. 1 shows a device with two displacement pistons.
Figure 2:
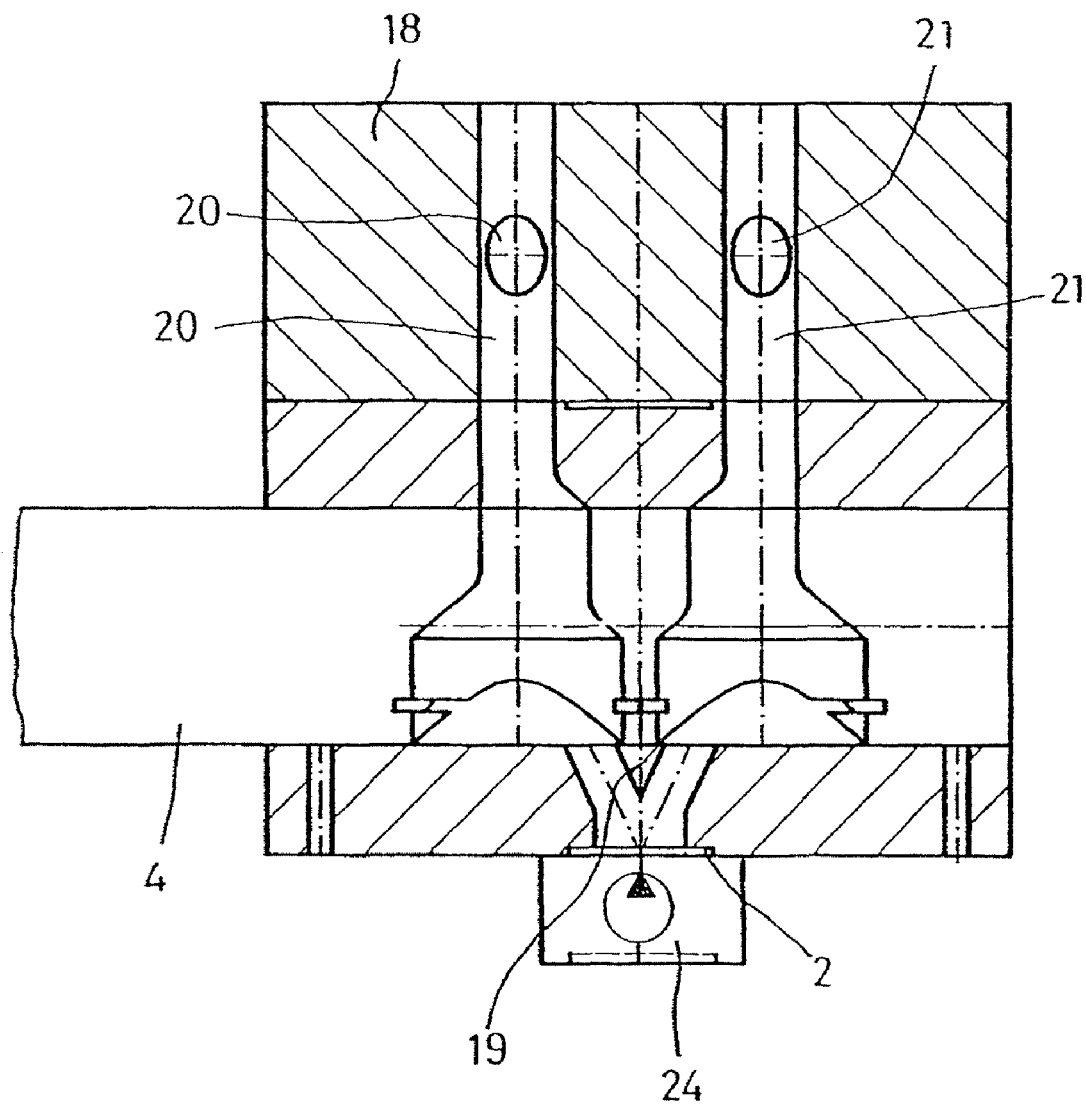
FIG. 2 shows a section through the screen carrier with a device according to FIG. 1.

FIGS. 1 and 2 show a housing 1 accommodating a screen carrier 4, whereby a supply channel 2 and a discharge channel 3 are arranged in the housing 1. A connection plate 18 connects to the side of the screen carrier 4 facing downstream.

Filter elements embodied as screens 5, 6 are provided in screen chambers 7, 8 in the screen carrier 4. It should be pointed out that the term "screen carrier" is used in connection with the term "screen," however, the term "screens" also relates to the different types of screens, filters and other retaining devices for contaminants.

A flow divider 19 is discernible in the supply channel 2 (FIG. 2) and a pressure generator 24, e.g., a pump, is arranged in front of the supply channel 2.

Furthermore, backflush channels 9 and 10 that open into the atmosphere are provided in the housing 1.

Partial channels 20, 21 are embodied in a straight line and accommodate displacement pistons 22 and 23 that can be activated via a mechanical tappet device in the arrangement shown in FIG. 1. In the arrangement according to FIG. 1, a connection plate 18 is discernible, through which the displacement pistons 22, 23 can be more easily replaced in the event of damage or the like.

FIG. 2 shows a section in the longitudinal axis of the screen carrier 4. FIG. 2 also shows the screens 5 and 6 and the screen chambers 7 and 8, as well as the partial channels 20 and 21.

To return to the representation in FIG. 1, the displacement piston 23 is in a position in which the screen 5 in the screen carrier 4 produces the connection between the supply channel 2 and the discharge channel 3, i.e., the device is thus in the production position.

In contrast, the displacement piston 22, however, is moved downward and, moreover, the screen 6 located in the screen carrier 4a is connected to the backflush channel 9 through displacement of the screen carrier 4a. In this position, the displacement piston 22 guides the clean material located in the partial channel 20 assigned thereto with adjustable, relatively high pressure to the clean screen side, which has thus been freed from dirt on the dirty screen side of the screen 6 located in the screen carrier 4a.

In the arrangement according to FIGS. 1 and 2, the end face of the displacement pistons 22 or 23 is always flowed around by material so that no dead zones occur in which material can decompose.

The pressure generator 24 additionally arranged in the area of the supply channel 2 is preferably a pump, but other pressure generators can also be used. The pump or other pressure generators ensures that, regardless of the backflush, i.e., regardless of whether both channels 20 and 21 are in use or only one channel, and regardless of where the displacement piston 22 or 23 is in channel 20 or 21, the process pressure in the area of the discharge channel 3 is always kept constant. This is very important for the equipment or tool connected to the discharge channel 3. Still further, the process pressure can be controlled depending on a pressure value measured at the discharge channel.

The invention claimed is:

1. A device for filtering a liquefied plastic, comprising:
   a housing;
   a supply channel;
   a discharge channel;
   backflush channels;
   two screen carriers slidably supported crosswise to a flow direction;
   at least two filter elements each of which are arranged in corresponding screen chambers and linked to the supply channel and the discharge channel;
   at least two displacement pistons being inserted in a corresponding partial channel leading from the screen chamber to the discharge channel, the at least two displacement pistons feed a mass free of contaminants out of the corresponding partial channels through the at least two filter elements to a corresponding backflush channel of the backflush channels when at least one of the two screen carriers is in a backflush position; and
   a pressure generator arranged in the supply channel, the pressure generator being structured to maintain a constant process pressure at the discharge channel and downstream equipment during a production phase.

2. The device according to claim 1, wherein the pressure generator is a pump.

3. The device according to claim 1, wherein the screen carriers are displacable such that the at least two filter elements can be removed from the screen chambers.

4. The device according to claim 1, further comprising connection plates attached to the housing and accommodating the screen carriers.

5. The device according to claim 1, wherein at least one of the displacement pistons are activated hydraulically.

6. The device according to claim 1, wherein at least one of the displacement pistons is activated mechanically.

7. The device according to claim 1, further comprising a flow divider arranged in the supply channel in front of the screen chambers.

8. The device according to claim 1, further comprising a flow diverter arranged in the discharge channel.

9. The device according to claim 1, wherein the operating pressure for the displacement pistons is adjustable.

10. The device according to claim 1, wherein at least one of the two displacement pistons is structured to load a clean screen side with purified plastic melt when a respective of the two screen carriers is in the backflush position.

11. The device according to claim 1, wherein the pressure generator is arranged so that the constant process pressure at the discharge channel is maintained when the at least one of the at least two filter screen carriers is in the backflush position and while the filter element associated with the at least one filter screen carrier is backflushed.

12. A device for filtering a liquefied plastic, comprising:
a housing accommodating a screen carrier, a supply channel and a discharge channel;
backflush channels provided in the housing which remain open, without valves, to the atmosphere;
partial channels arranged between the supply channel and the discharge channel;
displacement pistons arranged in the respective partial channels; and
a pressure generator arranged in the supply channel, the pressure generator being structured to maintain a constant process pressure at the discharge channel and downstream equipment during a production phase.

13. The device according to claim 12, further comprising a mechanical tappet device structured to activate the displacement pistons.

14. The device according to claim 12, further comprising a connection plate connecting to a side of the screen carrier facing downstream.

15. The device according to claim 12, wherein the pressure generator is a pump.

16. The device according to claim 12, wherein the pressure generator is structured such that regardless of a backflush a process pressure in an area of the discharge channel always is kept constant.

17. The device according to claim 12, further comprising filter elements structured and arranged as screens in screen chambers in the screen carrier.

18. The device according to claim 12, further comprising a flow divider in the supply channel.

19. The device according to claim 12, wherein an end face of the displacement pistons is always flowed around by material so that no dead zones occur in which the material can decompose.

20. The device according to claim 12, wherein one of the displacement pistons is in a position in which a screen in the screen carrier produces a connection between the supply channel and the discharge channel.

21. The device according to claim 12, wherein the screen carrier is structured to carry at least two filters, and the pressure generator is arranged so that the constant process pressure at the discharge channel is maintained when a backflush flows through one of the two filters.

22. A method for backflushing a liquefied plastic, comprising:
loading a clean screen side of a filter element with purified plastic melt after a screen carrier is slidably moved cross-wise to a displacement direction of the piston into a backflush position by plunging a displacement piston into a partial channel leading from a supply channel to a discharge channel when the screen carrier is in the backflush position and forcing the plastic melt out of the partial channel through the filter element in the backflush position, whereby the filter element is acted on with a pressure that is higher than an operating pressure prevailing on a production side of the filter element and a backflush portion is guided through a backflush channel that remains open to the atmosphere without a valve; and
maintaining a constant melt pressure at the discharge channel via a pressure generator arranged in the supply channel.

23. The method according to claim 22, wherein the backflush pressure is adjustable.

24. The method according to claim 22, further comprising controlling the melt pressure depending on a pressure value measured at the discharge channel.

25. The method according to claim 22, wherein the maintaining the constant melt pressure is achieved through a pressure generator arranged in the supply channel so that the constant melt pressure at the discharge channel is maintained while the filter element is acted on with a pressure that is higher than the operating pressure prevailing on the production side of the filter element.

* * * * *